United States Patent
Ikeda

(10) Patent No.: US 7,623,714 B2
(45) Date of Patent: Nov. 24, 2009

(54) FORM RECOGNITION SYSTEM, METHOD, PROGRAM, AND STORAGE MEDIUM

(75) Inventor: Hiroaki Ikeda, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 895 days.

(21) Appl. No.: 11/086,031

(22) Filed: Mar. 22, 2005

(65) Prior Publication Data
US 2005/0213819 A1  Sep. 29, 2005

(30) Foreign Application Priority Data
Mar. 25, 2004 (JP) .............................. 2004-088207

(51) Int. Cl.
G06K 9/46 (2006.01)
G06K 9/64 (2006.01)

(52) U.S. Cl. ....................... 382/190; 382/217

(58) Field of Classification Search ................. 382/217, 382/190
See application file for complete search history.

(56) References Cited

U.S. PATENT DOCUMENTS 5,502,575 A * 3/1996 Kai et al. ..................... 358/405
5,680,223 A * 10/1997 Cooper et al. ............... 358/403
6,370,271 B2 * 4/2002 Fu et al. ...................... 382/217
6,674,886 B2 * 1/2004 Davis et al. .................. 382/135
6,741,743 B2 * 5/2004 Stalcup et al. ............... 382/217
6,959,121 B2 * 10/2005 Kumazawa ................. 382/294
2002/0067854 A1 * 6/2002 Reintjes et al. ............. 382/199

FOREIGN PATENT DOCUMENTS

JP   10-269311 A   10/1998
JP   2000-285187 A  10/2000

* cited by examiner

*Primary Examiner*—Bhavesh M Mehta
*Assistant Examiner*—Hadi Akhavannik
(74) *Attorney, Agent, or Firm*—Cannon U.S.A. Inc IP Division

(57) ABSTRACT

The similarity between a search form and a registered form is calculated on a page-by-page basis in a predetermined order. Every time the page similarity is calculated, it is determined whether or not a value representing the similarity is smaller than a predetermined threshold value. If it is determined that the similarity value is smaller than the threshold value, the registered form is removed, at this point, from candidates for a recognition target. A form having a possibility of page repetition can also be recognized.

17 Claims, 5 Drawing Sheets

FIG. 4

| | PAGE COUNT | PAGE 1 | PAGE 2 | PAGE 3 | PAGE 4 |
|---|---|---|---|---|---|
| ID1 | 3 | A | B | C | |
| ID2 | 4 | D | E | F | G |
| ID3 | 2 | H | I | | |

FIG. 5

| | PAGE COUNT | PAGE 1 | PAGE 2 | PAGE 3 | PAGE 4 |
|---|---|---|---|---|---|
| ID1 | 3 | A | B | C | |
| ID2 | 4 | D | E⟩ | ⟨F | G |
| ID3 | 2 | H | I | | |

FIG. 6

STORAGE MEDIUM

| DIRECTORY INFORMATION |
|---|
| FIRST DATA-PROCESSING PROGRAM<br>PROGRAM CODE CORRESPONDING<br>TO STEPS IN FLOWCHART SHOWN IN FIG. 2 |
| SECOND DATA-PROCESSING PROGRAM<br>PROGRAM CODE CORRESPONDING<br>TO STEPS IN FLOWCHART SHOWN IN FIG. 3 |
| |

MEMORY MAP OF STORAGE MEDIUM

FORM RECOGNITION SYSTEM, METHOD, PROGRAM, AND STORAGE MEDIUM

BACKGROUND OF THE INVENTION

1. Field of the Invention

The present invention relates to systems, methods, programs, and storage media for automatic form recognition. Specifically, the present invention relates to a system, method, program, and storage medium for the recognition of forms, each containing multiple pages.

2. Description of the Related Art

Form recognition, in which forms are automatically classified according to previously registered formats, is a highly effective technique for performing entry processing for large quantities of forms. A form recognition system extracts feature values of form image data read by a scanner or the like, and creates form format data. The form recognition system then calculates the similarity between a search form and each registered form, and determines a registered form with the highest similarity to be the recognition result.

For form recognition, Japanese Patent Laid-Open No. 2000-285187 focuses attention on tables appearing on a form and determines the similarity based on the proportion of each table area to the total area of all the tables, the similarity being close to that determined based on visual appearance. However, since the similarity is calculated for each image entered, that is, on a page-by-page basis, the form recognition system disclosed in Japanese Patent Laid-Open No. 2000-285187 is unsuitable for the recognition of forms, each containing multiple pages.

For the recognition of forms with multiple pages, Japanese Patent Laid-Open No. 10-269311 discloses a method in which a partition form is placed at the top of each block of pages in order to process multiple pages as a single unit. That is, it is determined, every time a form is read, whether or not the form is a partition form, and, if it is, the subsequent form through to the form immediately before the next partition form are processed as a single unit. However, the form recognition disclosed in Japanese Patent Laid-Open No. 10-269311 is disadvantageous in that it involves a cumbersome process of inserting partition forms in dealing with forms with multiple pages.

SUMMARY OF THE INVENTION

The present invention has been made to solve such conventional problems described above, and allows for accurate and efficient recognition of multiple pages of forms without requiring a cumbersome process, such as insertion of partition forms.

In an aspect of the present invention, a form recognition system for identifying which of a plurality of previously registered forms corresponds to images of a search form with multiple pages includes: feature obtaining means for obtaining page feature values from the search form in a predetermined order; similarity calculating means for calculating a similarity value representing similarity between the page feature values obtained from the search form and page feature values of a registered form corresponding to the page feature values of the search form; target-form selecting means for removing the registered form from candidates for a recognition target if the similarity value is smaller than a predetermined value; and form determining means for determining a form of recognition result, based on registered forms not removed by the target-form selecting means, by repeatedly processing each page of the search form using the feature obtaining means, the similarity calculating means, and the target-form selecting means.

In another aspect of the present invention, a form recognition system for identifying which of a plurality of previously registered forms corresponds to images of a search form with multiple pages includes: a registered form memory for storing the possibility of page repetition in a registered form; feature obtaining means for obtaining feature values of each page of the search form; similarity calculating means for calculating a similarity value representing similarity between the feature values of each page of the search form obtained by the feature obtaining means, and the feature values of each page of the registered form; and form determining means for determining a registered form corresponding to the search form, based on the similarity calculated by the similarity calculating means. The similarity calculating means also calculates, if there is a possibility of page repetition in a registered form, the similarity of a page having the possibility of being repeated.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a table showing the data structure of a registered form in the form recognition system in FIG. 1.

FIG. 5 is a table showing the data structure of a registered form in the form recognition system of a second embodiment according to the present invention.

FIG. 6 shows a memory map of a storage medium for storing various data processing programs for the form recognition system in FIG. 1.

DESCRIPTION OF THE EMBODIMENTS

First Embodiment

Figure 1:
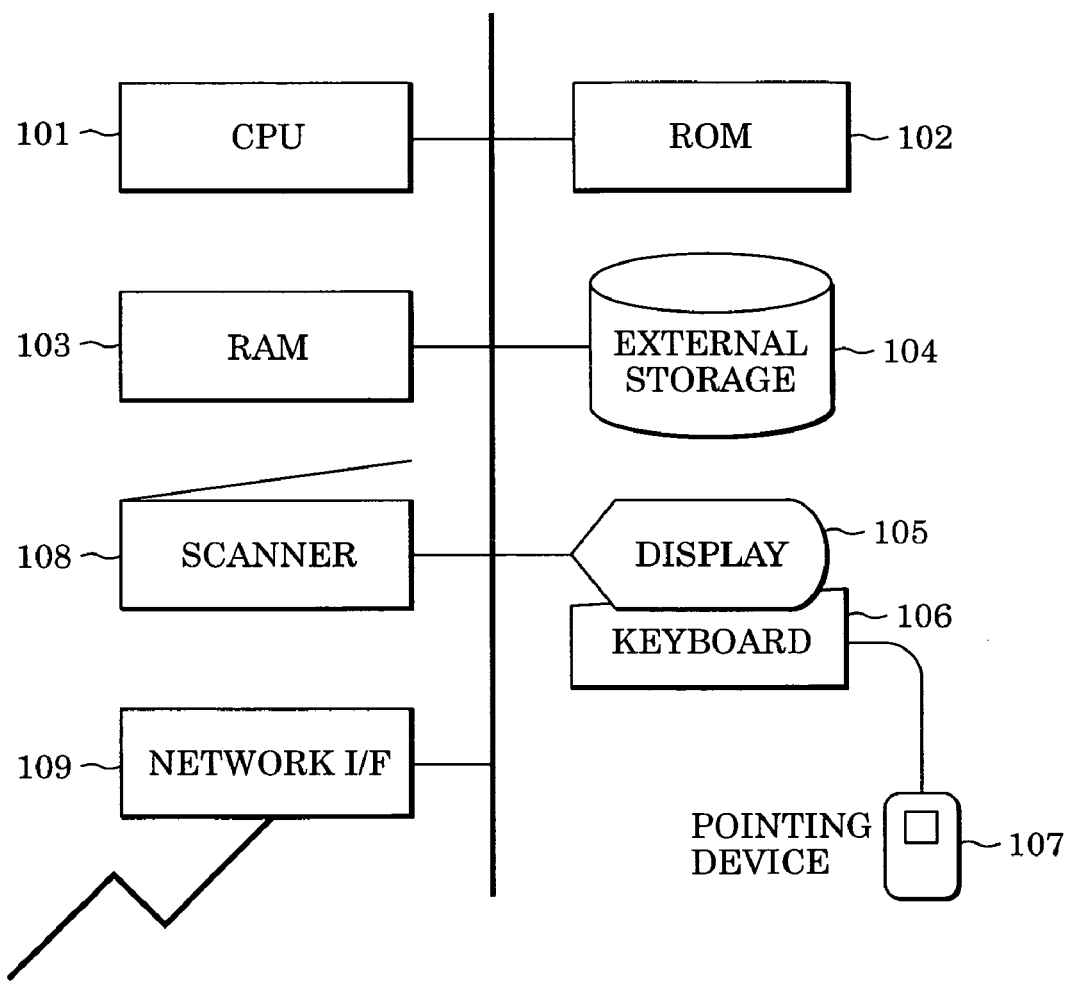
FIG. 1 is a block diagram showing a form recognition system of a first embodiment according to the present invention.

FIG. 1 is a block diagram showing a form recognition system of a first embodiment according to the present invention.

In FIG. 1, the form recognition system includes an external storage 104, such as a magnetic disk, and an image scanner 108. The form recognition system reads form image data from the external storage 104, or scans forms with the image scanner 108.

The form recognition system includes a CPU 101 for overall control. A control program for the CPU 101 is stored in a ROM (read-only memory) 102. Form images entered from the image scanner 108 are held in a RAM (random access memory) 103 and are processed for form recognition, according to the control program stored in the ROM 102. While a computer program for implementing the present invention is stored in a ROM in the present embodiment, the program may be stored in another storage medium, or may be received from another device via a network or the like.

Feature values for use in form recognition are stored in the ROM 102 together with the control program, or are read from the external storage 104 into the RAM 103.

Preprocessing, such as noise reduction, is carried out, as necessary, prior to the form recognition.

As shown in FIG. 1, the form recognition system includes a display 105, a keyboard 106, and a pointing device 107, such as a mouse. A network interface (IF) 109 is provided for communicating with remote systems (not shown) to send and receive programs, recognition dictionaries, data, and the like.

The present invention can be implemented by a general-purpose computer. In this case, a control program on a medium or the like may be stored in the external storage 104 to be executed by the CPU 101 under operator control or the like.

The form recognition system may have a structure in which the image scanner 108, the display 105, and the like are connected thereto via an interface.

Processing in the form recognition system in FIG. 1 will now be described.

Figure 2:
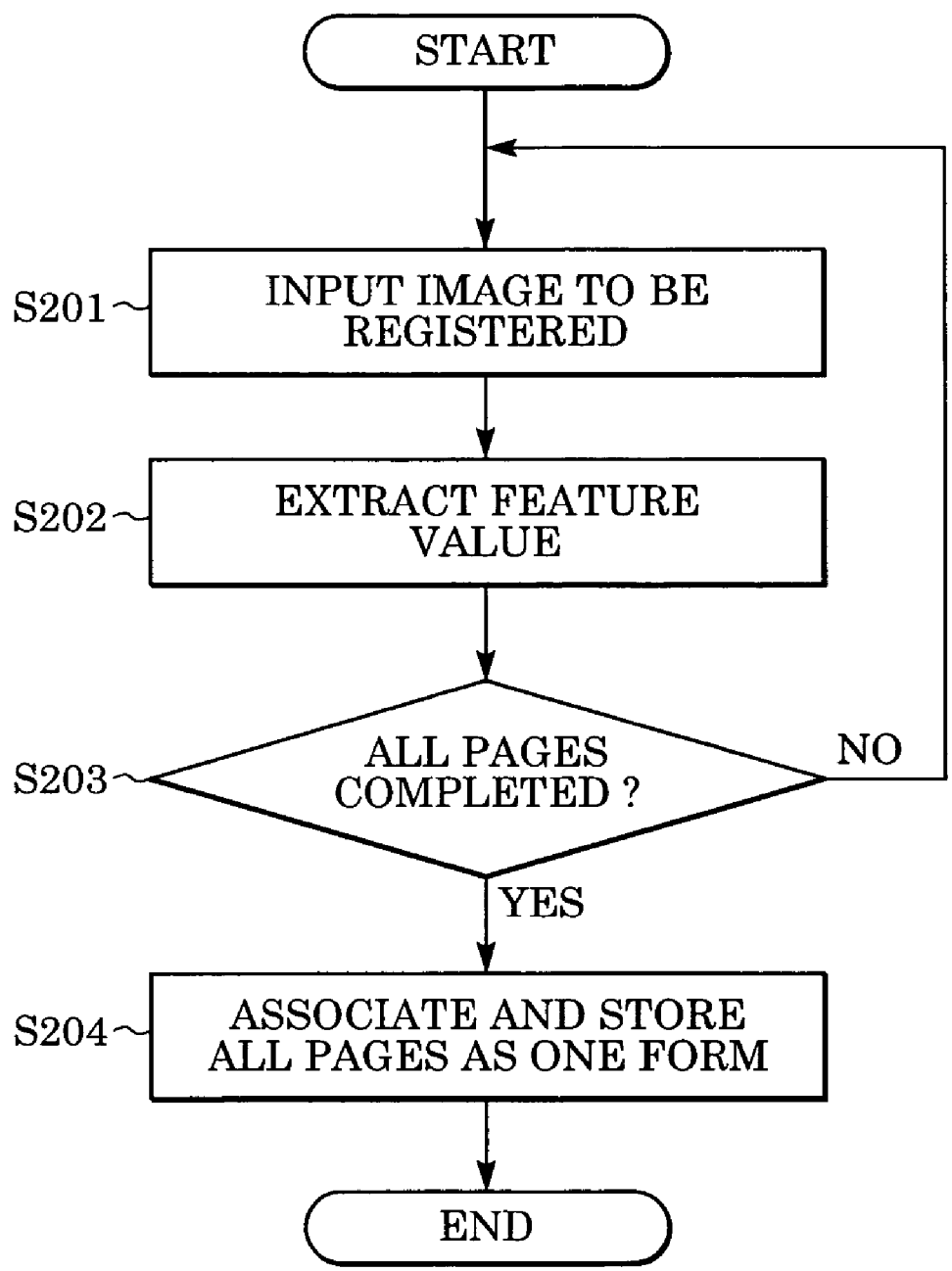
FIG. 2 is a flowchart showing registration processing in the form recognition system in FIG. 1.
Figure 3:
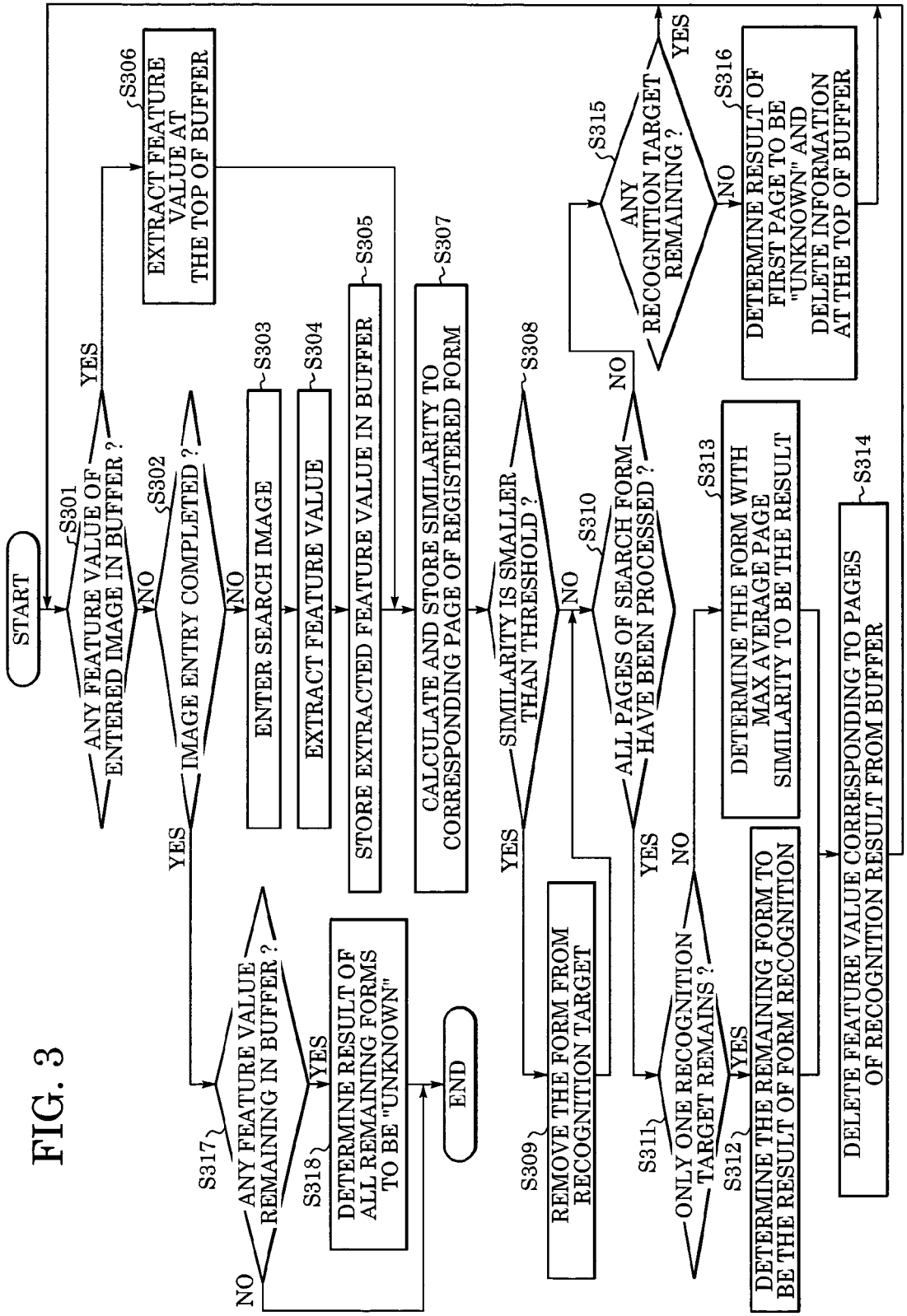
FIG. 3 is a flowchart showing recognition processing in the form recognition system in FIG. 1.

FIG. 2 is a flowchart showing the processing of registering a form to be used as a template in the form recognition system. FIG. 3 is a flowchart showing form recognition processing for identifying a registered form corresponding to a form entered.

In FIG. 2, the processing of form registration is executed according to the following steps.

Step S201: First, image data of a form to be registered is inputted through the image scanner 108 on a page-by-page basis.

Step S202: Feature values are extracted from a page of the image data inputted in step S201. The feature values include the size, position, and number of table frames in the form, and the number of cells included in each table frame.

Step S203: It is determined whether or not the extraction of feature values in all pages of the form to be registered has been completed. If not, the process returns to step S201. Steps S201 to S203 are repeated until the feature value extraction in all pages is completed.

Step S204: The feature values extracted from each page, in step S202, are stored while all the pages are associated with one another into a single form. The registration of a single form is thus completed. The image data and feature values of the registered form are stored in the RAM 103 or in the external storage 104.

The form data registered through the process in FIG. 2 is structured and stored, for example, as a table shown in FIG. 4. More specifically, a three-page form ID1 includes image data A on the first page, image data B on the second page, and image data C on the third page. A four-page form ID2 includes image data D on the first page, image data E on the second page, image data F on the third page, and image data G on the fourth page. A two-page form ID3 includes image data H on the first page and image data I on the second page.

Referring now to FIG. 3, the processing of form recognition is executed according to the following steps.

Step S301: In the present embodiment, feature values are extracted (step S305) from data of an image for each page (hereinafter referred to as "search image") of a form to be identified (hereinafter referred to as "search form"). The feature values of each page are sequentially stored in a buffer. First, in step S301, it is determined whether or not feature values that have not yet been processed for recognition exist in the buffer. If it is determined that the feature values exist, the process proceeds to step S306. If not, the process proceeds to step S302.

Step S302: In step S302, it is determined whether or not the entry of all pages of a search form has been completed. If it is determined that the entry of all pages has been completed, the process proceeds to step S317. If not, the process proceeds to step S303.

Step S303: The entry of search images of a search form starts in step S303. Then the process proceeds to step S304.

Step S304: Predetermined feature values are extracted from a page of the search image entered. As in the case of step S202 for a registered form, the feature values include the size, position, and number of table frames in the form, and the number of cells included in each table frame.

Step S305: Then, the feature values extracted in step S304 are stored in the buffer described with reference to step S301.

Step S306: If, in step S301, feature values have already been stored in the buffer, the top of the feature values in the buffer are extracted, and the process proceeds to step S307.

Step S307: The similarity between the feature values extracted in step S306 and those of a corresponding page of each registered form is calculated. A search image on the first page needs to be compared to the corresponding pages in all the registered forms, because the registered forms have not yet been narrowed down at this point. That is, if the registered forms listed in the table in FIG. 4 are to be compared, the similarities to the image data A, D, and H on the first pages of the forms ID1, ID2, and ID3, respectively, are calculated.

Step S308: A value representing the similarity determined in step S307 is compared to a predetermined threshold value. If the similarity value is smaller than the threshold value, the process proceeds to step S309. If the similarity is equal to or above the threshold, the process proceeds to step S310.

Step S309: A registered form with a corresponding page having a similarity value smaller than the threshold value is removed to narrow down the recognition targets. The process then proceeds to step S310. If, for example, the similarity value to the image data D is smaller than the threshold value, the form ID2 is removed to narrow the recognition targets down to the forms ID1 and ID3.

Step S310: It is determined whether or not the entry of search images and the calculation of feature values until the last page of the search form have been completed. If completed, the process proceeds to step S311. The process proceeds to step S315 if any pages remain unprocessed.

Step S311: It is determined whether or not the number of recognition targets has been narrowed down to one. If so, the process proceeds to step S312. If a plurality of registered forms still remain as recognition targets, the process proceeds to step S313.

Step S312: The only remaining form is determined to be the result of form recognition, and the process proceeds to step S314.

Step S313: If a plurality of forms still remain, for example, the similarities of all pages of each form are averaged so as to determine the form with the maximum average value to be the result of form recognition. The processing of determining the result of form recognition in step S313 is not limited to the way described above. The result of form recognition can be determined using various algorithms. For example, the lowest page similarities are compared to determine the form having a page with the maximum lowest similarity to be the result of form recognition.

Step S314: If the result of recognition is determined in step S312 or in step S313, feature values are deleted, by the amount corresponding to the number of pages of the resultant form, from the buffer in which the feature values are stored, for the subsequent recognition processing.

For example, in step S308, if the image data B and I on the second pages of the forms ID1 and ID3, respectively, are equal to or above the threshold value in similarity, and further, if the image data C on the third page is equal to or above the threshold value in similarity, both the forms ID1 and ID3 remain as recognition targets. If it is determined that the form ID3 is the recognition result, two pages (image data H and I) of feature values are deleted from the buffer.

As for the form ID1, the image data C on the third page has been pre-read and the feature values have already been extracted and stored in the buffer, since the similarity was to be calculated. Therefore, the feature values of the image data C can be immediately extracted to restart the recognition processing using the image data C as image data for the first page.

On the other hand, if it is determined that the form ID1 is the result of recognition, feature values of all the pages are deleted from the buffer. Processing then returns to step S301 for subsequent recognition processing. In the subsequent recognition processing, another image will be entered in step S303.

Step S315: If similarity calculation has not yet been completed to the last page of the search form, it is determined whether or not a registered form to be recognized still remains. If there is still a registered form remaining, the process returns to step S301 and the subsequent processing is repeated. If it is determined in step S315 that no registered form to be recognized remains, the process proceeds to step S316.

Step S316: If no registered form to be recognized remains, the recognition result of the first page of the search form is determined to be "Unknown". At the same time, information at the top of the feature values stored in the buffer is deleted. Then, a page that was the second page of the same search form becomes the first page, and the form recognition processing starts again by returning to step S301.

Steps S317 and S318: If it is determined in step S302 that the entry of search forms has been completed, it is determined in step S317 whether or not any feature values remain in the buffer. An empty buffer means that the recognition of all search images has been successfully completed. However, if any feature values remain in the buffer, the form recognition is unsuccessful. In step S318, the results of such unsuccessful recognition are all determined to be "Unknown". The user is notified of the presence of "Unknown" search forms.

As described above, in the first embodiment, the recognition of multiple pages of forms with various page counts can be carried out.

After the calculation of feature values of a search image, unsuccessful recognition, due to, for example, the absence of sufficiently similar registered form or the difference in page count, is completed by determining the result to be "Unknown." In such a case, even if the search image needs to be processed again, the recalculation of feature values is not required.

FIG. 6 shows a memory map of a storage medium for storing various data processing programs executable in the form recognition system. The memory map includes directory information, a first data-processing program including a program code for executing the processing in the flowchart shown in FIG. 2, and a second data-processing program including program code for executing the processing in the flowchart shown in FIG. 3.

Although not specifically shown, the directory information includes data, such as a recognition dictionary, associated with various programs. Programs for installing various programs on computers may also be included.

In the first embodiment, the accurate and efficient recognition of multiple pages of forms can be achieved without requiring a cumbersome process, such as insertion of partition forms.

Moreover, the number of similarity calculations, and thus, the time required for recognition processing can be reduced by narrowing down the target forms to be processed on a page-by-page basis. In addition, the accuracy of recognition can be improved, since recognition targets are narrowed down by removing registered forms that are different from the search form.

Second Embodiment

A form recognition system according to a second embodiment of the present invention will now be described with reference to the drawings.

The second embodiment is executable by the form recognition system having the same structure as in FIG. 1. In addition, the form recognition system of the second embodiment is capable of identifying forms with repeated appearance of specific pages.

Referring to FIG. 5, in a registered form ID2, an image data E registered on the second page and an image data F registered on the third page repeatedly appear. That is, after the appearance of an image data D on the first page, the image data E and the image data F repeatedly appear in such a manner as E, F, E, F, . . . E, and F. Then, an image data G on the fourth page appears at the end. In the table shown in FIG. 5, the image data E on the second page is marked with a rightward arrow, while the image data F on the third page is marked with a leftward arrow. The rightward arrow and the leftward arrow indicate the start page of repetition and the end page of repetition, respectively.

If a range of three or more pages repeatedly appear, the rightward and leftward arrows indicate the start and end pages of repetition, accordingly, in the same manner as those described above. Moreover, a plurality of repetition ranges can be defined within a single form.

In the case where the start position and the end position are on the same page, that is, the image data E on the second page is repeated in such a manner as E, E, . . . , and E, the second page is marked with both rightward and leftward arrows, or marked in other ways to define the repetition.

In the second embodiment, such page repetition is taken into consideration in calculating the similarity value in step S307 in FIG. 3. For example, if the similarity to the image data on the third page of the form ID2 is calculated and determined to be equal to or above a predetermined value in step S308, the similarities to both the image data G on the fourth page and to the image data E on the second page appearing as a result of repetition are calculated in determining the similarity to the next page. Moreover, if another registered form still remains as a recognition target, the similarity to that registered form is also to be calculated.

After the evaluation of similarity to the image data on the third page, if the similarity to the image data E is calculated in step S307 and determined to be equal to or above a predetermined value in step S308, and remains as a recognition target, it can be determined that the repetition of the image data E has occurred. In this case, the similarity to the image data F is to be subsequently calculated. If it is determined that the similarity to the image data F is equal to or above the predetermined value, both the image data G and the image data E are to be the comparison targets again.

In step S314, all of the pages (including repeated pages) of feature values are deleted, as recognition results, from the buffer.

As described above, in the second embodiment, the recognition of forms with multiple pages, specifically with a variable number of pages including partial repetition, can be performed by automatically determining the presence of repetition.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-088207 filed Mar. 25, 2004, which is hereby incorporated by reference herein.

What is claimed is:

1. A form recognition system for identifying which of a plurality of previously registered forms corresponds to a search form, each of the registered forms containing multiple pages, the search form containing multiple page images, the form recognition system comprising:
   feature obtaining means for obtaining page feature values from each page image contained in the search form;
   similarity calculating means for calculating, in a predetermined page order, page similarity value representing similarity between the page feature value obtained from one of the page images contained in the search form and page feature value of a corresponding page contained in one of the registered forms of candidates, wherein the page feature value contained in the registered forms include at least one of size, position and number of table frames in the registered form;
   target-form selecting means for removing one of the registered forms from the candidates when the page similarity value between the page feature value obtained from one of the page images contained in the search form and the page feature value of the corresponding page contained in one of the registered forms is smaller than a predetermined value; and
   form determining means for repeatedly processing each page of the search form in the predetermined page order using the similarity calculating means and the target-form selecting means, and determining one of the registered forms corresponding to the search form from among the candidates not removed by the target-form selecting means.

2. The form recognition system according to claim 1, further comprising:
   feature-value registering means for storing the page feature values of the pages of the search form obtained by the feature obtaining means,
   wherein the similarity calculating means obtains, in the predetermined page order, the page feature values of the search form from the feature-value registering means, and calculates the page similarity value between the obtained page feature values of the search form and the corresponding page feature values of the registered form.

3. The form recognition system according to claim 1, wherein a possibility of a page repetition is stored in the registered form, and wherein the similarity calculating means calculates, if there is a possibility of page repetition in the search form, the similarity value for a page having a possibility of being repeated.

4. The form recognition system according to claim 1, wherein if the target-form selecting means excludes all of the registered forms from the candidates before the form determining means determines one of the registered forms corresponding to the search form, the first page of the search form is determined to be unknown, and the next page is processed, as the top page, by the similarity calculating means, the target-form selecting means, and the form determining means.

5. The form recognition system according to claim 1, wherein, if a plurality of registered forms remain as the candidates after the repeated processing, the form determining means determines one of the registered forms corresponding to the search form based on the page similarity values calculated by the similarity calculating means.

6. A form recognition method for controlling a system for identifying which of a plurality of previously registered forms corresponds to images of a search form with multiple pages, the form recognition method comprising:
   using a processor to perform the following:
      obtaining page feature values from the search form in a predetermined order;
      calculating a similarity value representing similarity between the page feature values obtained from the search form and page feature values of a registered form corresponding to the page feature values of the search form, wherein the page feature value contained in the registered forms include at least one of size, position and number of table frames in the registered form;
      removing the registered form from candidates for a recognition target if the similarity value is smaller than a predetermined value; and
      determining a form of recognition result, based on registered forms not removed in the target-form selecting step, by repeatedly processing each page of the search form through obtaining page feature values, calculating the similarity value, and removing the registered form.

7. The form recognition method according to claim 6, further comprising:
   obtaining feature values of each page of the search form, and
   storing the feature values in a feature-value registering memory;
   wherein in calculating the similarity value, the page feature values of the search form is obtained from the feature-value registering memory, and the similarity value between the obtained page feature values of the search form and the corresponding page feature values of the registered form is calculated.

8. The form recognition method according to claim 6, further comprising:
   storing a page repetition in the registered form;
   wherein in calculating the similarity value, if there is a possibility of page repetition in the search form, the similarity of a page having a possibility of being repeated is calculated.

9. The form recognition method according to claim 6, wherein if, before completion of similarity calculation for all of the pages, all of the registered forms are excluded in removing the registered form, the first page of the search form is determined to be unknown, and the next page is processed, as the top page, through obtaining page feature values, calculating the similarity value, removing the registered form, and determining the form of recognition result.

10. The form recognition method according to claim 6, wherein, if a plurality of registered forms remain as candidates, the form of recognition result is determined by determining the form of recognition result by using the similarity value to each page of each registered form.

11. A form recognition method for controlling a system for identifying which of a plurality of previously registered forms corresponds to images of a search form with multiple pages, the form recognition method comprising:
using a processor to perform the following:
obtaining feature values of each page of the search form;
calculating a similarity value representing similarity between the feature values of each page of the search form, and the feature values of each page of the registered form, wherein the feature value contained in the registered forms include at least one of size, position and number of table frames in the registered form; and
determining a registered form corresponding to the search form, based on the similarity value calculated;
wherein in calculating the similarity value, it is determined, based on a registered form memory for storing a possibility of page repetition in a registered form, whether or not a registered form includes page repetition; and, for a registered form having the possibility of page repetition, the similarity to a page having the possibility of page repetition is also calculated.

12. A computer-readable storage medium storing a computer program for causing a computer to execute a form recognition method for controlling a computer for identifying which of a plurality of previously registered forms corresponds to images of a search form with multiple pages, the form recognition method causing the computer to perform steps comprising:
obtaining feature values of each page of the search form;
calculating a similarity value representing similarity between the feature values of each page of the search form, and the feature values of each page of the registered form, wherein the feature value contained in the registered forms include at least one of size, position and number of table frames in the registered form; and
determining a registered form corresponding to the search form, based on the similarity value calculated;
wherein in calculating the similarity value, it is determined, based on a registered form memory for storing a possibility of page repetition in a registered form, whether or not a registered form includes page repetition; and, for a registered form having the possibility of page repetition, the similarity to a page having the possibility of page repetition is also calculated.

13. A computer-readable storage medium storing a computer program for causing a computer to execute a form recognition method for controlling a computer for identifying which of a plurality of previously registered forms corresponds to images of a search form with multiple pages, the form recognition method causing the computer to perform steps comprising:
obtaining page feature values from the search form in a predetermined order;
calculating a similarity value representing similarity between the page feature values obtained from the search form and page feature values of a registered form corresponding to the page feature values of the search form, wherein the rage feature values contained in the registered forms include at least one of size, position and number of table frames in the registered form;
removing the registered form from candidates for a recognition target if the similarity value is smaller than a predetermined value; and
determining a form of recognition result, based on registered forms not removed, by repeatedly processing each page of the search form through obtaining page feature values, calculating the similarity value, and removing the registered form.

14. The computer-readable storage medium according to claim 13, further comprising:
obtaining feature values of each page of the search form, and
storing the feature values in a feature-value registering memory;
wherein in calculating the similarity value, the page feature values of the search form is obtained from the feature-value registering memory, and the similarity value between the obtained page feature values of the search form and the corresponding page feature values of the registered form is calculated.

15. The computer-readable storage medium according to claim 13, further comprising:
storing a page repetition in the registered form;
wherein in calculating the similarity value, if there is a possibility of page repetition in the search form, the similarity of a page having a possibility of being repeated is calculated.

16. The computer-readable storage medium according to claim 13, wherein if, before completion of similarity calculation for all of the pages, all of the registered forms are excluded in removing the registered form, the first page of the search form is determined to be unknown, and the next page is processed, as the top page, through the obtaining page feature values, calculating the similarity value, removing the registered form, and determining the form of recognition result.

17. The computer-readable storage medium according to claim 13, wherein, if a plurality of registered forms remain as candidates, the form of recognition result is determined by determining the form of recognition result by using the similarity value to each page of each registered form.

* * * * *